(12) United States Patent
Jang et al.

(10) Patent No.: US 8,226,902 B2
(45) Date of Patent: Jul. 24, 2012

(54) APPARATUS FOR MANUFACTURING CARBON NANOTUBES AND METHOD OF MANUFACTURING CARBON NANOTUBES WITH THE SAME

(75) Inventors: Suk-Won Jang, Seoul (KR); Ho-Soo Hwang, Gyeonggi-do (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 403 days.

(21) Appl. No.: 12/284,839

(22) Filed: Sep. 25, 2008

(65) Prior Publication Data
US 2009/0087371 A1 Apr. 2, 2009

(30) Foreign Application Priority Data
Sep. 28, 2007 (KR) .................. 10-2007-0098072

(51) Int. Cl.
*B01J 8/18* (2006.01)
*D01F 9/12* (2006.01)

(52) U.S. Cl. .............. 422/189; 422/139; 423/447.1; 423/447.3; 977/843

(58) Field of Classification Search .... 423/447.1–447.3; 422/189, 139–143; 977/843
See application file for complete search history.

(56) References Cited

U.S. PATENT DOCUMENTS

| 6,315,977 B1 * | 11/2001 | Cantacuzene ............. 423/651 |
| 6,919,064 B2 * | 7/2005 | Resasco et al. ........... 423/447.3 |
| 2003/0192811 A1 * | 10/2003 | Thompson et al. ....... 208/208 R |

FOREIGN PATENT DOCUMENTS

| CN | 1266813 A | 9/2000 |
| CN | 1327943 A | 12/2001 |
| KR | 10-2001-0110822 A | 12/2001 |
| KR | 10-2005-0078456 A | 8/2005 |
| KR | 20-20398220 Y1 | 10/2005 |
| KR | 10-0593423 B1 | 6/2006 |

* cited by examiner

*Primary Examiner* — Daniel C. McCracken
(74) *Attorney, Agent, or Firm* — Kilpatrick Townsend & Stockton LLP

(57) ABSTRACT

Provided are an apparatus for manufacturing carbon nanotubes and a method of manufacturing carbon nanotubes with the apparatus. A plurality of carbon-nanotube-synthesizing units are disposed in series to continuously perform a carbon-nanotube-synthesizing process. Thus, carbon nanotubes having a uniform quality can be synthesized.

6 Claims, 1 Drawing Sheet

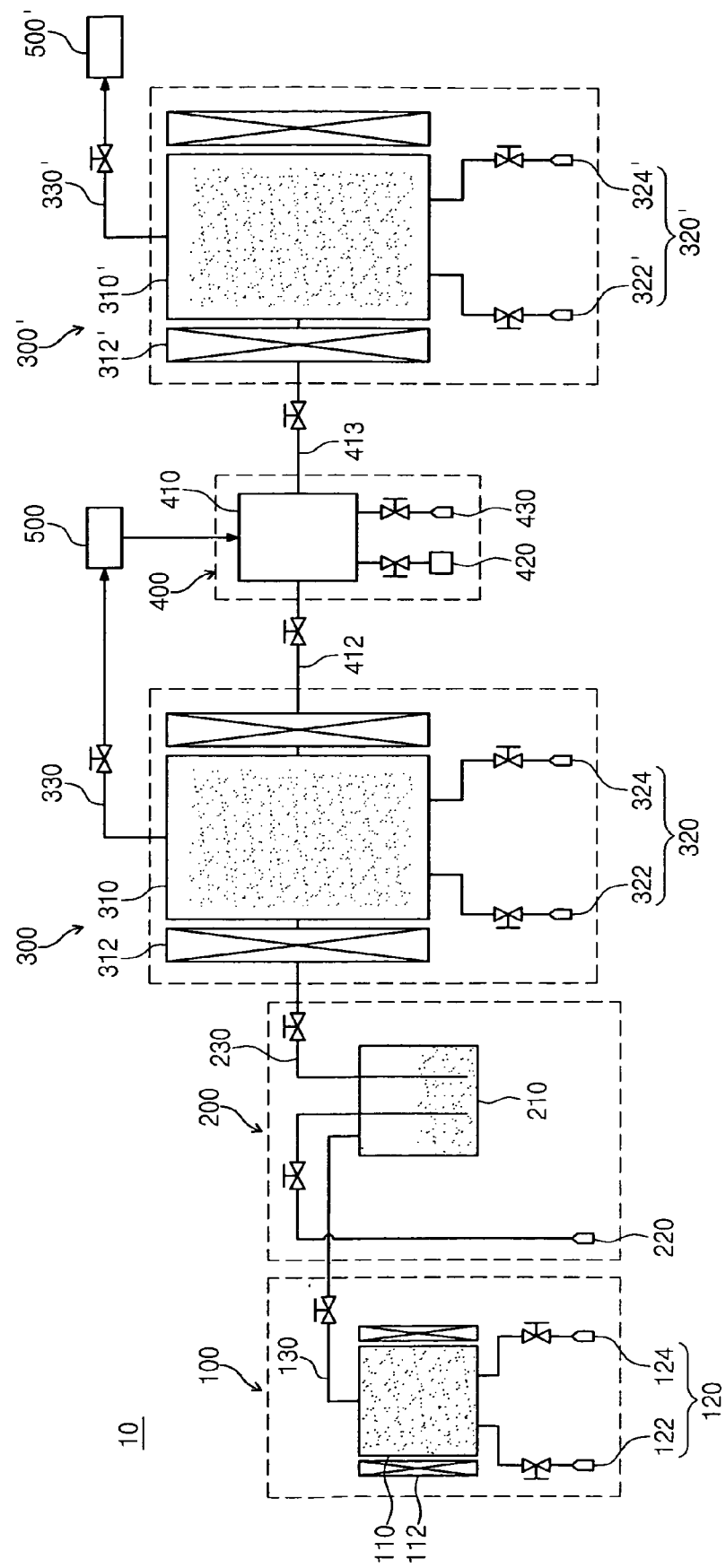

APPARATUS FOR MANUFACTURING CARBON NANOTUBES AND METHOD OF MANUFACTURING CARBON NANOTUBES WITH THE SAME

CROSS-REFERENCE TO RELATED APPLICATION

This U.S. non-provisional patent application claims priority under 35 U.S.C. §119 of Korean Patent Application No. 10-2007-0098072, filed on Sep. 28, 2007, the entire contents of which are hereby incorporated by reference.

BACKGROUND

The present inventive concept disclosed herein relates to an apparatus and a method for manufacturing carbon nanotubes, and more particularly, to a fluidized bed-type apparatus for manufacturing carbon nanotubes and a method of manufacturing carbon nanotubes with the apparatus.

Carbon atoms of carbon nanotubes are connected to their three nearest-neighbor carbon atoms through $SP^2$ bonds to form hexagonal rings. Such a hexagonal ring is repeated in a honeycomb shape to form a graphite sheet, and the graphite sheet is rolled to form a cylindrical shape. Such a cylindrical structure generally has a diameter ranging from several nm to several hundreds of nm, and has a length several ten times through several thousand times or more times greater than the diameter.

Such carbon nanotubes may be classified into a single-wall nanotube, a multi-wall nanotube, and a rope nanotube according to a rolled shape of a graphite sheet. Also, the carbon nanotubes may have various electric characteristics according to a rolled angle and a structure of a graphite sheet. For example, an armchair-type carbon nanotube conducts electricity like a metal, and a zigzag-type carbon nanotube has semiconducting characteristics.

Since the carbon nanotubes have excellent electric characteristics, a high mechanical strength, and stable chemical characteristics, they can be widely applied to various technical fields and draw attention as a future new material. For example, the carbon nanotubes can be applied to secondary cells, electrodes of electrochemical storage devices such as fuel cells or super capacitors, electromagnetic wave shields, field emission displays, or gas sensors.

Typical methods of synthesizing carbon nanotubes include an electric arc method, a laser vaporization method, a pyrolysis vapor deposition method, and a plasma chemical vapor deposition, in which the pyrolysis vapor deposition method are mainly used. The pyrolysis vapor deposition method includes growing carbon nanotubes through a metal catalyst while discharging a gas containing carbon into a high temperature reactor, and the carbon nanotubes may be synthesized in the state where a fluidized bed of the metal catalyst is formed by supplying a fluidizing gas into the reactor.

SUMMARY OF THE INVENTIVE CONCEPT

The present inventive concept provides an apparatus for manufacturing carbon nanotubes and a method of manufacturing carbon nanotubes with the apparatus, which can perform a carbon-nanotube-synthesizing process through a series of continuous processes.

The present inventive concept also provides an apparatus for manufacturing carbon nanotubes and a method of manufacturing carbon nanotubes with the apparatus, which can synthesize carbon nanotubes having a uniform quality through continuous processes.

The objects of the present inventive concept are not limited thereto, and the following descriptions will fully convey the other objects that are not mentioned to those skilled in the art.

Embodiments of the present inventive concept provide apparatuses for manufacturing carbon nanotubes, the apparatuses including: a plurality of synthesis units disposed in series where a carbon-nanotube-synthesizing process is performed; delivery units each disposed between the synthesis units and delivering the carbon nanotubes that are being synthesized from the synthesis unit disposed before to the synthesis unit disposed after.

In some embodiments, the apparatuses may further include: a catalyst supply unit supplying a catalyst to the synthesis unit disposed in front among the synthesis units; and a collection unit collecting the carbon nanotubes that have been synthesized from the synthesis unit disposed in rear among the synthesis units.

In other embodiments, each of the synthesis units may include: a reactor where the carbon-nanotube-synthesizing process is preformed; a fluidizing gas supplier supplying a fluidizing gas for forming a fluidized bed of the catalyst in the reactor; and a source gas supplier supplying a carbon source gas to the fluidized bed of the catalyst in the reactor.

In other embodiments of the present inventive concept, methods of manufacturing carbon nanotubes, the methods including: supplying a catalyst to a synthesis unit disposed in front among synthesis units disposed in series, delivering the carbon nanotubes that are being synthesized between the synthesis units adjacent to each other among the synthesis units, and collecting the carbon nanotubes that have been synthesized from the synthesis unit disposed in rear among the synthesis units.

In some embodiments, the synthesis units may form a fluidized bed of the catalyst using a fluidizing gas, and supply a carbon source gas to the fluidized bed of the catalyst to synthesize the carbon nanotubes.

BRIEF DESCRIPTION OF THE FIGURES

The accompanying figures are included to provide a further understanding of the present inventive concept, and are incorporated in and constitute a part of this specification. The drawings illustrate exemplary embodiments of the present inventive concept and, together with the description, serve to explain principles of the present inventive concept. In the figures:

FIG. 1 is a schematic view illustrating an apparatus for manufacturing carbon nanotubes according to an embodiment of the present inventive concept.

DETAILED DESCRIPTION OF PREFERRED EMBODIMENTS

Preferred embodiments of the present inventive concept will be described below in more detail with reference to the accompanying drawings. The present inventive concept may, however, be embodied in different forms and should not be constructed as limited to the embodiments set forth herein. Rather, these embodiments are provided so that this disclosure will be thorough and complete, and will fully convey the scope of the present inventive concept to those skilled in the art. Like reference numerals refer to like elements throughout.

Embodiment

FIG. 1 is a schematic view illustrating an apparatus for manufacturing carbon nanotubes according to an embodiment of the present inventive concept.

Referring to FIG. 1, an apparatus 10 for manufacturing carbon nanotubes includes a catalyst reduction unit 100, a catalyst supply unit 200, a first carbon nanotube synthesis unit 300, a second carbon nanotube synthesis unit 300', a carbon nanotube delivery unit 400, and a carbon nanotube collection unit 500'.

The first and the second carbon nanotube synthesis unit 300 and 300' are sequentially disposed in series, and the carbon nanotube delivery unit 400 is disposed between the first and the second carbon nanotube synthesis unit 300 and 300'. The catalyst supply unit 200 is connected to the first carbon nanotube synthesis unit 300 disposed in front, and the carbon nanotube collection unit 500' is connected to the second carbon nanotube synthesis unit 300' disposed in rear. The catalyst reduction unit 100 is disposed in front of the catalyst supply unit 200.

The catalyst reduction unit 100 reduces an oxidized metal catalyst, and the catalyst supply unit 200 provides the reduced metal catalyst to the first carbon nanotube synthesis unit 300. The first carbon nanotube synthesis unit 300 reacts the reduced metal catalyst with a carbon source gas to synthesize carbon nanotubes through vapor phase. The carbon nanotube delivery unit 400 delivers the carbon nanotubes that are being synthesized in the first carbon nanotube synthesis unit 300, to the second carbon nanotube synthesis unit 300' disposed in rear. The second carbon nanotube synthesis unit 300' reacts a carbon source gas with the carbon nanotubes that are being synthesized and delivered from the first carbon nanotube synthesis unit 300, to complete the synthesis of the carbon nanotubes. The carbon nanotube collection unit 500' collects the carbon nanotubes that have been synthesized.

Although the first and the second carbon nanotube synthesis units 300 and 300' are disposed in series in this embodiment, two or more carbon nanotube synthesis units may be disposed in series. Also, carbon nanotube delivery units may be disposed between a plurality of carbon nanotube synthesis units, respectively.

An organic metal compound, including a magnetic substance such as iron (Fe), cobalt (Co), and nickel (Ni), is used as the metal catalyst in a carbon nanotube synthesis process. Since the metal catalyst may be oxidized through a drying operation and a sintering operation in a manufacturing process, a reduction process for removing an oxide layer surrounding the metal catalyst must be performed to synthesize the carbon nanotubes. To this end, the catalyst reduction unit 100 is provided for reducing the oxidized metal catalyst.

The catalyst reduction unit 100 includes a reduction furnace 110, a first gas supply member 120, and a first catalyst supply line 130. The reduction furnace 110 may have an approximately vertical cylindrical shape and formed of a heat-resistant material such as quartz or graphite. A heater 112 is disposed around the reduction furnace 110 to heat the reduction furnace 110 to a process temperature. The heater 112 may be formed in a coil shape to surround an outer wall of the reduction furnace 110. The reduction furnace 110 is maintained at a temperature ranging from about 500° C. to about 600° C. during the process, and the oxidized metal catalyst, a reduction gas, and a fluidizing gas are provided in the reduction furnace 110.

The first gas supply member 120 includes a reduction gas supplier 122 and a fluidizing gas supplier 124. The reduction gas supplier 122 is connected to a lower end of the reduction furnace 110 and supplies the reduction gas for reducing the oxidized metal catalyst, into the reduction furnace 110. A hydrogen gas may be used as the reduction gas. The fluidizing gas supplier 124 is connected to the lower end of the reduction furnace 110 and supplies the fluidizing gas for forming a fluidized bed of the metal catalyst, into the reduction furnace 110. An inert gas such as helium, nitrogen and argon may be used as the fluidizing gas. A gas such as methane, acetylene, carbon monoxide or carbon dioxide, or a mixed gas of the gas and an argon gas may be used as the fluidizing gas when needed. The fluidizing gas forms the fluidized bed in the reduction furnace 110 to activate a reaction of the reduction gas and the metal catalyst and is used to carry the reduced metal catalyst to the catalyst supply unit 200 through the first catalyst supply line 130.

One end of the first catalyst supply line 130 is connected to an upper end of the reduction furnace 110, and the other end is connected to the catalyst supply unit 200. The first catalyst supply line 130 supplies the metal catalyst reduced in the reduction furnace 110 to the catalyst supply unit 200.

The catalyst supply unit 200 supplies the reduced metal catalyst supplied from the catalyst reduction unit 100 to the first carbon nanotube synthesis unit 300. The catalyst supply unit 200 includes a storage tank 210 for storing the reduced metal catalyst. The storage tank 210 is connected to the reduction furnace 110 through the first catalyst supply line 130. A carrier gas supplier 220 and one end of a second catalyst supply line 230 are connected to the storage tank 210, to provide a predetermined amount of the metal catalyst to the first carbon nanotube synthesis unit 300 using a gas pressure. The other end of the second catalyst supply line 230 is connected to the first carbon nanotube synthesis unit 300. An inert gas such as a nitrogen gas may be used as the carrier gas. The metal catalyst stored in the storage tank 210 is supplied to the first carbon nanotube synthesis unit 300 through the second catalyst supply line 230 by the pressure of an nitrogen gas supplied from the carrier gas supplier 220 to the storage tank 210.

The first carbon nanotube synthesis unit 300 supplies the metal catalyst and the carbon source gas into a heated reactor 310, and thermally decomposes the carbon source gas to synthesize the carbon nanotubes through vapor phase. The first carbon nanotube synthesis unit 300 includes the reactor 310, a second gas supply member 320, and an exhaust line 330.

The reactor 310 is formed of a heat-resistant material such as quartz or graphite. The reactor 310 may have an approximately vertical cylindrical shape. A heater 312 is disposed on an outer side of the reactor 310 to heat the reactor 310 to a process temperature. The heater 312 may be formed in a coil shape to surround an outer wall of the reactor 310. The reactor 310 is maintained at a high temperature during the process. The metal catalyst is provided to the reactor 310 through the second catalyst supply line 230 of the catalyst supply unit 200, and the carbon source gas and the fluidizing gas are supplied through the second gas supply member 320.

The second gas supply member 320 includes a source gas supplier 322 and a fluidizing gas supplier 324. The source gas supplier 322 is connected to a lower end of the reactor 310 and supplies the carbon source gas into the reactor 310. The carbon source gas may include at least one selected from a group consisting of acetylene, ethylene, methane, benzene, xylene, cyclohexane, carbon monoxide and carbon dioxide. The fluidizing gas supplier 324 is connected to the lower end of the reactor 310 and supplies the fluidizing gas into the reactor 310. An inert gas such as helium, nitrogen and argon may be used as the fluidizing gas. A gas such as methane, acetylene, carbon monoxide or carbon dioxide, or a mixed gas of the gas and an argon gas may be uses as the fluidizing gas when needed.

The carbon nanotubes increase in weight according to the growth of the carbon nanotubes synthesized through the reaction of the carbon source gas and the metal catalyst. In this case, the fluidizing gas prevents the falling of the carbon nanotubes in the direction of gravity due to the increased weight. The fluidizing gas forms a fluidized bed in the reactor 310 to activate the reaction of the carbon source gas and the metal catalyst and carry the carbon nanotubes grown by the metal catalyst to the carbon nanotube collection unit 500 through the exhaust line 330.

An upper end of the reactor 310 is connected to the exhaust line 330 for exhausting an exhaust gas including the carbon nanotubes synthesized in the reactor 310. The exhaust gas is provided to the carbon nanotube collection unit 500 through the exhaust line 330. The exhaust line 330 may be coupled to an exhausting device (not shown) such as a vacuum pump or an exhaust fan for forcing the exhaust gas to be exhausted.

The carbon nanotube delivery unit 400 is disposed between the first and the second carbon nanotube synthesis units 300 and 300' and suctions the carbon nanotubes that are being synthesized in the first carbon nanotube synthesis unit 300 and then discharging and delivering them to the second carbon nanotube synthesis unit 300'. The carbon nanotube delivery unit 400 includes a storage tank 410 for temporarily storing the carbon nanotubes. The storage tank 410 is connected to the first carbon nanotube synthesis unit 300 through a first supply line 412, and to the second carbon nanotube synthesis unit 300' through a second supply line 413. A suction member 420 and a carrier gas supply member 430 are connected to the storage tank 410. The suction member 420 applies a negative pressure to the storage tank 410 such that the carbon nanotubes that are being synthesized in the first carbon nanotube synthesis unit 300 are suctioned into the first storage tank 410 through the first supply line 412. The carrier gas supply member 430 supplies a carrier gas to the storage tank 410 to provide a predetermined amount of the carbon nanotubes stored in the storage tank 410 to the second carbon nanotube synthesis unit 300' through the second supply line 413. An inert gas such as a nitrogen gas may be used as the carrier gas. Meanwhile, the carbon nanotubes collected to the carbon nanotube collection unit 500 from the first carbon nanotube synthesis unit 300, may be supplied to the carbon nanotube delivery unit 400 in the state that the exhaust gas is removed.

The second carbon nanotube synthesis unit 300' receives the carbon nanotubes that are being synthesized from the first carbon nanotube synthesis unit 300 through the carbon nanotube delivery unit 400 and fully reacts the carbon nanotubes with the carbon source gas to complete the synthesis of the carbon nanotubes. Since the second carbon nanotube synthesis unit 300' has the same configuration as that of the first carbon nanotube synthesis unit 300, the detailed descriptions thereof will be omitted. Reference numerals 310', 312', 322', 324', 330' and 500' represent a reactor, a heater, a source gas supply, a fluidizing gas supply, an exhaust line, and a carbon nanotube collection unit, respectively.

The process of synthesizing carbon nanotubes will now be described with the carbon-nanotube-manufacturing apparatus having the above-described configuration.

Firstly, the metal catalyst reduced in the catalyst reduction unit 100 is provided to the catalyst supply unit 200. The catalyst supply unit 200 continuously supplies the predetermined amount of the metal catalyst to the first carbon nanotube synthesis unit 300. The first carbon nanotube synthesis unit 300 performs the carbon nanotube synthesizing process using a fluidized bed-type method. Since the metal catalyst is continuously supplied to the first carbon nanotube synthesis unit 300 in the predetermined amount, the carbon nanotubes of a different synthesis level are mixed in the first carbon nanotube synthesis unit 300. While the synthesizing process is performed in the first carbon nanotube synthesis unit 300, the carbon nanotubes that are being synthesized in the first carbon nanotube synthesis unit 300 are repeatedly delivered to the second carbon nanotube synthesis unit 300' on a predetermined cycle. The second carbon nanotube synthesis unit 300' performs the carbon nanotube synthesizing process for the carbon nanotubes that are being synthesized and delivered from the first carbon nanotube synthesis unit 300. The synthesizing process of the second carbon nanotube synthesis unit 300' is performed for a sufficient time such that the synthesis of the carbon nanotubes arrives at a saturation state. The carbon nanotubes completed in the second carbon nanotube synthesis unit 300' are collected into the carbon nanotube collection unit 500'.

As described above, the apparatus for manufacturing carbon nanotubes according to the present inventive concept can synthesize the carbon nanotubes having a uniform quality by disposing the plurality of units for synthesizing carbon-nanotubes in series and continuously performing the carbon-nanotube-synthesizing processes.

According to the present inventive concept, the carbon-nanotube-synthesizing process can be performed through the series of continuous processes.

According to the present inventive concept, the carbon nanotubes having a uniform quality can be synthesized through the continuous processes.

The above-disclosed subject matter is to be considered illustrative, and not restrictive, and the appended claims are intended to cover all such modifications, enhancements, and other embodiments, which fall within the true spirit and scope of the present inventive concept. Thus, to the maximum extent allowed by law, the scope of the present inventive concept is to be determined by the broadest permissible interpretation of the following claims and their equivalents, and shall not be restricted or limited by the foregoing detailed description.

What is claimed is:

1. An apparatus for manufacturing carbon nanotubes, the apparatus comprising:
   a plurality of synthesis units disposed in series where a carbon-nanotube-synthesizing process is performed;
   delivery units each disposed between the synthesis units and delivering the carbon nanotubes that are being synthesized from the synthesis unit disposed before to the synthesis unit disposed after;
   a catalyst reduction unit for removing an oxide layer surrounding a catalyst;
   a catalyst supply unit disposed between the catalyst reduction unit and the first synthesis unit and supplying the catalyst which the oxide layer is removed to the first reactor,
   wherein each of the synthesis units comprises:
      a first synthesis unit including a first reactor where a carbon-nanotube-synthesizing process is performed; and
      a second synthesis unit disposed after the first synthesis unit and including a second reactor where a carbon-nanotube-synthesizing process is performed;
   wherein each of the delivery units comprises:
      a storage tank connected to the synthesis unit disposed before and the synthesis unit disposed after, and storing the carbon nanotubes;

a suction member for applying a negative pressure to the storage tank to transfer the carbon nanotubes that are being synthesized from the synthesis unit disposed before to the storage tank; and a carrier gas supply member for supplying a carrier gas to the storage tank to transfer the carbon nanotubes stored in the storage tank to the synthesis unit disposed after, wherein the catalyst supply unit comprises:

a catalyst storage tank storing the catalyst which the oxide layer is removed;

a first catalyst supply line connecting the catalyst reduction unit and the catalyst storage tank and supplying the catalyst which the oxide layer is removed to the catalyst storage tank;

a second catalyst supply line connecting the catalyst storage tank and the first reactor and the catalyst stored in the catalyst storage tank to the first reactor; and a second carrier gas supply member for supplying a carrier gas to the catalyst storage tank to provide a predetermined amount of the catalyst stored in the catalyst storage tank to the first reactor.

2. The apparatus of claim 1, wherein the carrier gas supply member supplies the carrier gas to the bottom portion of inner space of the catalyst storage tank.

3. The apparatus of claim 1, further comprising:

a first supply line connecting the first reactor and the storage tank and on which a first valve is mounted; and a second supply line connecting the storage tank and the second reactor and on which a second valve is mounted.

4. An apparatus for manufacturing carbon nanotubes, the apparatus comprising:

a plurality of synthesis units disposed in series where a carbon-nanotube-synthesizing process is performed;

delivery units each disposed between the synthesis units and delivering the carbon nanotubes that are being synthesized from the synthesis unit disposed before to the synthesis unit disposed after;

a first collection unit connected to the top wall of the first reactor and collecting carbon nanotubes synthesized from the first reactor;

a second collection unit connected to the top wall of the second reactor and collecting carbon nanotubes synthesized from the second reactor;

wherein each of the synthesis units comprises:

a first synthesis unit including a first reactor where a carbon-nanotube-synthesizing process is performed; and a second synthesis unit disposed after the first synthesis unit and including a second reactor where a carbon-nanotube-synthesizing process is performed, wherein each of the delivery units comprises:

a storage tank connected to the synthesis unit disposed before and the synthesis unit disposed after, and storing the carbon nanotubes;

a suction member for applying a negative pressure to the storage tank to transfer the carbon nanotubes that are being synthesized from the synthesis unit disposed before to the storage tank; and a carrier gas supply member for supplying a carrier gas to the storage tank to transfer the carbon nanotubes stored in the storage tank to the synthesis unit disposed after, wherein the second supply line has one end connected to the side wall of the storage tank and another end connected to the side wall of the second reactor.

5. The apparatus of claim 4, further comprising:

a first supply line connecting the first reactor and the storage tank and on which a first valve is mounted; and a second supply line connecting the storage tank and the second reactor and on which a second valve is mounted.

6. The apparatus of claim 5, wherein the first supply line has one end connected to the side wall of the first reactor and other end connected to the side wall of the storage tank; and wherein the second supply line has one end connected to the side wall of the storage tank and another end connected to the side wall of the second reactor.

* * * * *